(12) United States Patent
Vuong et al.

(10) Patent No.: US 12,365,777 B2
(45) Date of Patent: Jul. 22, 2025

(54) FILLED SILICONE FOAM LAYER, COMPOSITIONS AND METHODS FOR THEIR MANUFACTURE, AND ARTICLES INCLUDING THE FILLED SILICONE FOAM LAYER

(71) Applicant: ROGERS CORPORATION, Chandler, AZ (US)

(72) Inventors: Katherine Vuong, Chicago, IL (US); Max Kristy, Chicago, IL (US); Kenneth Mazich, Chicago, IL (US)

(73) Assignee: ROGERS CORPORATION, Chandler, AZ (US)

( * ) Notice: Subject to any disclaimer, the term of this patent is extended or adjusted under 35 U.S.C. 154(b) by 0 days.

(21) Appl. No.: 17/971,800

(22) Filed: Oct. 24, 2022

(65) Prior Publication Data
US 2023/0134127 A1 May 4, 2023

Related U.S. Application Data

(60) Provisional application No. 63/274,094, filed on Nov. 1, 2021.

(51) Int. Cl.
| | |
|---|---|
| *C08G 77/00* | (2006.01) |
| *C08G 77/08* | (2006.01) |
| *C08G 77/12* | (2006.01) |
| *C08G 77/20* | (2006.01) |
| *C08J 9/00* | (2006.01) |
| *C08J 9/32* | (2006.01) |
| *C08K 3/013* | (2018.01) |
| *C08K 3/26* | (2006.01) |
| *C08K 3/34* | (2006.01) |
| *C08K 5/5415* | (2006.01) |
| *C08K 7/20* | (2006.01) |
| *G09F 9/30* | (2006.01) |
| *H01L 23/14* | (2006.01) |

(52) U.S. Cl.
CPC .............. *C08J 9/008* (2013.01); *C08G 77/08* (2013.01); *C08G 77/12* (2013.01); *C08G 77/20* (2013.01); *C08G 77/80* (2013.01); *C08J 9/0014* (2013.01); *C08J 2203/22* (2013.01); *C08J 2383/05* (2013.01); *C08J 2383/07* (2013.01)

(58) Field of Classification Search
CPC ................................ C08G 77/12; C08G 77/80
See application file for complete search history.

(56) References Cited

U.S. PATENT DOCUMENTS

| | | | | |
|---|---|---|---|---|
| 5,246,973 | A | * | 9/1993 | Nakamura ................. C08J 9/32 521/154 |
| 5,614,563 | A | * | 3/1997 | Ishida ........................ C08J 9/32 521/154 |
| 9,204,697 | B2 | | 12/2015 | Yang |
| 9,586,304 | B2 | | 3/2017 | Qian et al. |
| 2001/0014714 | A1 | * | 8/2001 | Amarasekera ............ H01B 3/46 524/588 |
| 2003/0047718 | A1 | | 3/2003 | Narayan et al. |
| 2011/0111196 | A1 | * | 5/2011 | Hubbs ...................... B32B 38/08 428/305.5 |
| 2015/0107669 | A1 | * | 4/2015 | Gotoh ........................ C08J 9/32 521/154 |
| 2016/0053069 | A1 | * | 2/2016 | Gotoh ..................... B32B 27/36 428/313.5 |
| 2017/0226305 | A1 | * | 8/2017 | Katano .................. C08J 9/0038 |
| 2017/0233519 | A1 | | 8/2017 | Corinti et al. |
| 2019/0136006 | A1 | * | 5/2019 | Rodrigues Camilo .. C08J 9/228 |
| 2019/0300755 | A1 | | 10/2019 | Devolder |
| 2020/0331797 | A1 | | 10/2020 | Isaev |

FOREIGN PATENT DOCUMENTS

| | | | | | |
|---|---|---|---|---|---|
| CN | | 106633908 A | * | 5/2017 | ............ C08K 13/04 |
| EP | | 1094091 A1 | | 4/2001 | |
| JP | | 2004137308 A | * | 5/2004 | |
| WO | | 2023/037271 A1 | | 3/2023 | |

OTHER PUBLICATIONS

Machine translation of JP-2004137308-A obtained from the European Patent Office in Nov. 2023 (Year: 2023).*
Machine translation of CN-106633908-A obtained from the European Patent Office in May 2024 (Year: 2024).*
International Search Report of the ISA/EPO mailed Jan. 17, 2023 for PCT Application No. PCT/US2022/047532 filed Oct. 24, 2022, 4 pages.
Written Opinion of the ISA/EPO mailed Jan. 17, 2023 for PCT Application No. PCT/US2022/047532 filed Oct. 24, 2022, 6 pages.

* cited by examiner

*Primary Examiner* — Melissa A Rioja
(74) *Attorney, Agent, or Firm* — CANTOR COLBURN LLP

(57) ABSTRACT

A very thin filled silicone foam layer is formed from a composition that includes a curable polysiloxane composition including an alkenyl-substituted polyorganosiloxane, a hydride-substituted polyorganosiloxane, and a cure catalyst; a plurality of expanded polymer microspheres having a largest dimension of less than the thickness of the foam; and a filler composition, wherein each component of the filler composition has a largest dimension of less than the thickness of the foam, the filler composition comprising a particulate ceramic filler, a particulate calcium carbonate filler, or a particulate aluminosilicate clay filler having a plate morphology, or a particulate aluminosilicate clay filler having a hollow tubular morphology, a particulate polymeric silsesquioxane filler, or a particulate methyl-phenyl MQ filler, or a plurality of glass microspheres, or a particulate paraffin wax, or a combination thereof; wherein the curable filled composition has a viscosity of less than 400,000 centiStokes, or 100,000 to 350,000 centiStokes.

17 Claims, No Drawings

FILLED SILICONE FOAM LAYER, COMPOSITIONS AND METHODS FOR THEIR MANUFACTURE, AND ARTICLES INCLUDING THE FILLED SILICONE FOAM LAYER

CROSS-REFERENCE TO RELATED APPLICATION

This application claims priority to and the benefit of U.S. Provisional Application No. 63/274,094 filed on Nov. 1, 2021, the entire content of which is incorporated herein by reference.

BACKGROUND

This disclosure relates to a composition for the manufacture of a filled silicone foam layer, a cured, filled silicone foam layer made from the composition and its method of manufacture, and articles including the filled silicone foam layer.

There is a developing need to reduce, absorb and prevent impact from external physical shock or thermal extremes in portable electronic devices, including smart devices, particularly those with organic light emitting diode (OLED) and flexible OLED screen configurations. With high demand for thinner portable electronics, a resulting desire for thinner cushioning solutions must also be fulfilled. Impact delivered to the external design of the electronic device may result in damage to the screen itself and/or its internal components. Thermal effects due to the external environment of the device or prolonged use may affect the capabilities of current market cushioning products due to their high glass transition temperature, resulting in a reduction in performance. Impact or stress can also present itself in the form of use of the device where a rollable, foldable, or flexible functionality of the screen will introduce pressure points in the bending of the screen, which must be mitigated to maintain the quality of the display. Random and instantaneous contact between screens and impact forces can lead to cracks, indentations, or material failure. This impact and thermal mitigation is needed using a solution that is on the micrometer scale, creating manufacturing and formulation limitations that typically would not apply to larger applications.

BRIEF SUMMARY

A composition for the manufacture of a filled silicone foam layer includes a curable polysiloxane composition including an alkenyl-substituted polyorganosiloxane, a hydride-substituted polyorganosiloxane, and a cure catalyst; a plurality of expanded polymer microspheres having a largest dimension of less than the thickness of the foam; and a filler composition, wherein each component of the filler composition has a largest dimension of less than the thickness of the foam, the filler composition comprising a particulate ceramic filler, a particulate calcium carbonate filler, or a particulate aluminosilicate clay filler having a plate morphology, or a particulate aluminosilicate clay filler having a hollow tubular morphology, a particulate polymeric silsesquioxane filler, or a particulate methyl-phenyl MQ filler, or a plurality of glass microspheres, or a particulate paraffin wax, or a combination thereof; wherein the curable filled composition has a viscosity of less than 400,000 centiStokes, or 100,000 to 350,000 centiStokes.

A filled silicone foam layer includes the cured curable composition, and has a thickness from 20 to 300 micrometers.

Articles comprising the filled silicone foam layer are disclosed, in particular a screen for an electronic device.

The above described and other features are exemplified by the following detailed description and claims.

DETAILED DESCRIPTION

The inventors hereof have developed a very thin, filled silicone foam layer having an excellent combination of impact and other properties, including low compressive force deflection, low compression set, low water absorption, low glass transition temperature, and surface smoothness. This combination of properties is achieved by the foam layer including a silicone matrix, expanded polymer microspheres, and a specific filler composition. The silicone matrix provides at least low compressive force deflection, low compression set, low water absorption, low glass transition temperature, and surface smoothness. The expanded polymer microspheres and the specific filler composition further contributes to the low compressive force deflection and low water absorption, and also provides a crush zone that is highly effective to provide impact resistance. This combination of characteristics make the filled silicone foam layer especially suitable for use in electronic devices, particularly very thin electronic devices.

In particular, the expanded polymer microspheres and filler composition are dispersed within a curable polysiloxane composition using a hydrosilylation cure composition to form into a solid, yet porous silicone sheet. The use of silicone as the matrix (network-forming polymer) provides many advantages that meet current market needs such as softness and physical characteristics that are constant under a variety of thermal conditions. It also enables much higher level of filler loadings that would be unachievable in, for example, polyurethane foams or hybrid polymer systems. In an aspect, the silicone may have non-reactive groups pendant to the siloxane chain, such as phenyl groups. The expanded polymer microspheres and fillers in the silicone foam layer are present at a concentration and in a combination that can promote optimal interaction with the silicone chains, thereby allowing the crush zone to absorb as much of the impact as possible. Certain of the fillers can be of a shape and modulus that can render them more susceptible to crushing.

A curable filled composition for the manufacture of the silicon foam layer further includes in addition to the expanded polymer microspheres and the specific filler composition, a curable polysiloxane composition that includes a curable alkenyl-substituted polysiloxane, a co-curable hydride-substituted polysiloxane, and a cure catalyst. The components of the curable polysiloxane composition are selected to provide a liquid curable polysiloxane composition that allows the incorporation of the expanded polymer microspheres and the filler composition and the formation of very thin layers.

The components of the curable polysiloxane composition are further selected to be elastomeric, to provide a silicone foam layer having a target compression-deflection character, for example for a material inserted between electronic device screen components. The components of the curable polysiloxane composition are still further selected to provide a cured silicone matrix that maintains its elastic behavior over many cycles on compression deflection, for example over the life of the screen. This is a property reflected by stress relaxation and compression set of the selected chosen elastomer sets. Consistent performance across a range of thermal conditions due to the low glass transition of the cured silicone also provides an advantage in the application.

Curable Polysiloxane Composition

To obtain the advantageous properties of the silicone foam layer, in particular the combination of stress relaxation, low compression set, and high durability, a specific combination of silicone components is used, in particular a higher molecular weight alkenyl-substituted polyorganosiloxane, a lower molecular weight alkenyl-substituted polyorganosiloxane, and a hydride-substituted polyorganosiloxane as described in greater detail below. The use of an optional, low viscosity, non-volatile polyorganosiloxane copolymer can allow further adjustment of the viscosity of the curable polysiloxane composition (and thus the curable filled composition) and the surface properties and texture of the cured silicone layer. The relative amounts of each component in the curable polysiloxane composition can be adjusted to allow tailoring of viscosity of the composition, and thus filler level, which can affect the other properties in the cured silicone foam layer. In particular, a highly viscous liquid (e.g., 80,000 to 150,000 centiStokes (cSt)) alkenyl-substituted polydimethylsiloxane of a high molecular weight and low vinyl content provides the bulk of the curable polysiloxane composition to reduce the overall crosslink density and provide an advantageously softer material despite having a high density due to filler content. A lower molecular weight alkenyl-substituted poly(methyl phenyl)siloxane is present to further improve impact properties. Without being bound by theory, it is believed that a network produced by reaction of these two components provides the desired low water absorption, low compression set, and low glass transition temperature.

Suitable polyorganosiloxanes substituted an alkenyl group are generally represented by the formula:

$$M_a D_b T_c Q_d,$$

wherein the subscripts a, b, c, and d are zero or a positive integer, subject to the limitation that if subscripts a and b are both equal to zero, subscript c is greater than or equal to two; M has the formula $R_3SiO_{1/2}$; D has the formula $R_2SiO_{2/2}$; T has the formula $RSiO_{3/2}$; and Q has the formula $SiO_{4/2}$, wherein each R group independently represents hydrogen, terminally-substituted $C_{1-6}$ alkenyl groups, substituted and unsubstituted monovalent hydrocarbon groups having from one to forty, or 1 to 6 carbon atoms each, subject to the limitation that at least 1, preferably at least 2, of the R groups are alkenyl R groups. Suitable alkenyl R-groups are exemplified by vinyl, allyl, 1-butenyl, 1-pentenyl, and 1-hexenyl, with vinyl being particularly useful. The alkenyl group can be bonded at the molecular chain terminals, in pendant positions on the molecular chain, or both. In an aspect the alkenyl group is a terminal group, for example a vinyl group bonded at the molecular chain terminals, i.e., an alkenyl-terminated polyorganosiloxane.

Other silicon-bonded organic groups in the alkenyl-substituted polyorganosiloxane, when present, are exemplified by substituted and unsubstituted monovalent hydrocarbon groups having from one to forty carbon atoms, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Methyl and phenyl are specifically useful. The concentration of phenyl groups present in the alkenyl-substituted polyorganosiloxane chain resin is optimized to increase the energy absorption from the impact.

The alkenyl-containing polyorganosiloxane can have straight chain, partially branched straight chain, branched-chain, or network molecular structure, or can be a mixture of such structures. The alkenyl-substituted polyorganosiloxane is exemplified by vinyl-endblocked polydimethylsiloxanes; vinyl-endblocked dimethylsiloxane-diphenylsiloxane copolymers; vinyl-endblocked dimethylsiloxane-methylphenylsiloxane copolymers; vinyl-endblocked dimethylsiloxane-methylphenylsiloxane-diphenylsiloxane copolymers; vinyl-endblocked dimethylsiloxane-methylphenylsiloxane copolymers; vinyl dimethylsiloxane-methylvinylsiloxane copolymers; vinyl-endblocked methylvinylsiloxane-methylphenylsiloxane copolymers; vinyl-endblocked dimethylsiloxane-methylvinylsiloxane-methylphenylsiloxane copolymers; dimethylvinylsiloxy-endblocked methylvinylpolysiloxanes; dimethylvinylsiloxy-endblocked methylvinylphenylsiloxanes; dimethylvinylsiloxy-endblocked dimethylvinylsiloxane-methylvinylsiloxane copolymers; dimethylvinylsiloxy-endblocked dimethylsiloxane-methylphenylsiloxane copolymers; dimethylvinylsiloxy-endblocked dimethylsiloxane-diphenylsiloxane copolymers; or a combination thereof.

The curable polysiloxane composition preferably includes a combination of at least two of the above-described alkenyl-substituted polyorganosiloxanes, one having a higher molecular weight and one having a lower molecular weight. The relative amount of each compound will depend on its particular molecular weight, and can therefore vary widely. Similarly, the molecular weight of each compound can vary, depending on the amount of the compound as well as the desired characteristics of the cured silicone. The lower molecular weight component(s) allow for a reduced overall viscosity of the mixture providing for easy of casting, coating, spreading, and various methods of texturing including casting onto a carrier. Alternatively, the lower molecular weight compound can be an alkenyl-terminated polydiorganosiloxane containing both methyl groups and phenyl groups in the siloxane backbone. In an aspect the higher molecular weight alkenyl-substituted polydiorganosiloxane is a vinyl-terminated polydimethylsiloxane and the lower molecular weight alkenyl-substituted polydiorganosiloxane is a vinyl-terminated dimethylsiloxane-diphenylsiloxane copolymer, a vinyl-terminated dimethylsiloxane-methylphenylsiloxane copolymer, a vinyl-terminated dimethylsiloxane-methylphenylsiloxane-diphenylsiloxane copolymer, or a combination thereof.

When two (or more) curable alkenyl-substituted polyorganosiloxanes are used to formulate the curable silicone composition, the relative amount of each will depend on the type and amount of each component, as well as the desired characteristics of the cured silicone foam layer. In general, the curable polysiloxane composition can comprise 40 to 99 weight percent (wt %), or 65 to 95 of the first, higher molecular weight curable silicone composition, and 10 to 50 wt %, or 15 to 35 wt % of the second, lower molecular weight silicone composition, each based on the total weight of the curable silicone composition.

A suitable polyorganosiloxane having at least two silicon-bonded hydrogen atoms per molecule is generally represented by the formula:

$$M'_a D'_b T'_c Q'_d,$$

wherein the subscripts a, b, c, and d are zero or a positive integer, subject to the limitation that if subscripts a and b are both equal to zero, subscript c is greater than or equal to two; M' has the formula $R_3SiO_{1/2}$; D' has the formula $R_2SiO_{2/2}$; T' has the formula $RSiO_{3/2}$; and Q' has the formula $SiO_{4/2}$, wherein each R group independently represents hydrogen, substituted and unsubstituted monovalent hydrocarbon groups having from one to forty, or one to six carbon atoms each, subject to the limitation that at least two of the R groups are hydrogen. Preferably, each of the R groups of the polyorganosiloxane having at least two silicon-bonded hydrogen atoms per molecule are independently selected from hydrogen, methyl, ethyl, propyl, butyl, pentyl, hexyl, aryl, phenyl, tolyl, xylyl, aralkyl, benzyl, phenethyl, halogenated alkyl, 3-chloropropyl, 3,3,3-trifluoropropyl, or a combination thereof. Methyl and phenyl are preferred.

The hydrogen can be bonded to silicon at the molecular chain terminals, in pendant positions on the molecular chain, or both. In an aspect, the hydrogens are substituted at terminal positions. In another aspect, at least 3 to 4 hydrogens are present per molecule. The hydrogen-containing polyorganosiloxane component can have straight chain, partially branched straight chain, branched-chain, cyclic, or network molecular structure, or can be a mixture of two or more different polyorganosiloxanes with the exemplified molecular structures.

The hydrogen-containing polyorganosiloxane is exemplified by trimethylsiloxy-endblocked methylhydrogenpolysiloxanes; trimethylsiloxy-endblocked dimethylsiloxane-methylhydrogensiloxane copolymers; trimethylsiloxy-endblocked methylhydrogensiloxane-methylphenylsiloxane copolymers; trimethylsiloxy-endblocked dimethylsiloxane-methylhydrogensiloxane-methylphenylsiloxane copolymers; dimethylhydrogensiloxy-endblocked dimethylpolysiloxanes; dimethylhydrogensiloxy-endblocked methylhydrogenpolysiloxanes; dimethylhydrogensiloxy-endblocked dimethylsiloxanes-methylhydrogensiloxane copolymers; dimethylhydrogensiloxy-endblocked dimethylsiloxane-methylphenylsiloxane copolymers; and dimethylhydrogensiloxy-endblocked methylphenylpolysiloxanes.

The hydride-containing polyorganosiloxane component is used in an amount sufficient to cure the composition, preferably in a quantity that provides from 1.0 to 10 silicon-bonded hydrogen atoms per alkenyl group in the alkenyl-containing polyorganosiloxane component. When the number of silicon-bonded hydrogen atoms per alkenyl group exceeds 10, gas bubbles can be produced during cure and the heat resistance of the resulting cured silicone can progressively decline.

One convenient method for the formulation of the curable filled composition is to combine two different two-part curable silicone compositions, each containing an alkenyl-containing component and a hydride-containing component. Suitable curable polysiloxane compositions can have a viscosity of, for example, less than 400,000 centiStokes (cSt), for example 100,000 to 250,000 cSt. Such two-part formulations can be formulated individually or are commercially available.

The curable polysiloxane composition can further optionally comprise a reactive polyorganosiloxane, that is, a polyorganosiloxane having a reactive group different from an alkenyl group or a reactive Si—H group, and that can be covalently bound to the polyorganosiloxane. Without being bound by theory, it is hypothesized that the reactive polyorganosiloxane enhances binding of the cured silicone layer, particularly to the backing layer. In this aspect, the reactive organosiloxane can be represented by the formula:

$$M''_a D''_b T''_c Q''_d$$

wherein the subscripts a, b, c, and d are zero or a positive integer, subject to the limitation that if subscripts a and b are both equal to zero, subscript c is greater than or equal to two; M" has the formula $R_3SiO_{1/2}$; D" has the formula $R_2SiO_{2/2}$; T" has the formula $RSiO_{3/2}$; and Q" has the formula $SiO_{4/2}$, wherein each R group independently represents hydrogen, alkenyl groups, substituted and unsubstituted monovalent hydrocarbon groups having from one to forty, or one to ten carbon atoms each, subject to the limitation that, in addition to any alkenyl groups and/or reactive hydride groups present in the silicone, one or more of the R groups is a reactive organic group. Suitable reactive groups include, for example, acrylates, methacrylates, and epoxy groups.

Polyorganosiloxanes containing such reactive groups can be derived by the reaction of a trialkoxysilane monomer containing the reactive group during synthesis of the polyorganosiloxane containing the reactive group. Alternatively, the reactive group can be provided as a separate component (e.g., in the form of a trialkoxysilane monomer) in admixture with a two-part system as described above. Dialkoxy alkylsilane and alkoxy dialkylsilane monomers containing the reactive groups can alternatively be used. The alkoxy and/or alkyl groups in the foregoing monomers can have 1 to 10, or 1 to 6, or 1 to 3 carbon atoms. One suitable alkoxysilane monomer is an epoxy silane represented by formula (1):

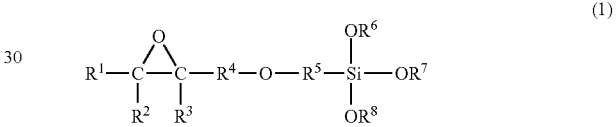

(1)

wherein $R^1$, $R^2$, and $R^3$ are independently hydrogen or $C_{1-10}$ hydrocarbon groups; $R^4$ and $R^5$ are independently $C_{1-10}$ alkylene or $C_{1-10}$ alkylidene groups; and $R^6$, $R^7$, and $R^8$ are independently $C_{1-10}$ hydrocarbon groups. The hydrocarbon groups can contain 1 to 6 carbon atoms, or 1 to 4 carbon atoms. These hydrocarbon groups can be alkyl. The alkylene or alkylidene groups $R^4$ and $R^5$. Preferably contain 1 to 6 carbon atoms, or 1 to 4 carbon atoms, or 1 or 2 carbon atoms. The alkylene and alkylidene groups can be methylene, ethylene, propylene, and the like.

The alkoxysilane monomer can also be a (meth)acrylic silane represented by the formula (2):

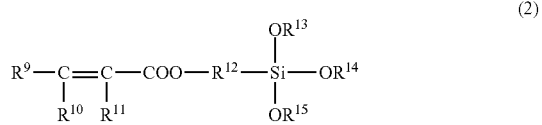

(2)

wherein $R^9$, $R^{10}$, and $R^{11}$ are independently hydrogen or $C_{1-10}$ hydrocarbon groups; $R^{12}$ is a $C_{1-10}$ alkylene or $C_{2-10}$ alkylidene group; and $R^{13}$, $R^{14}$ and $R^{15}$ are independently $C_{1-10}$ hydrocarbon groups. The hydrocarbon groups. Preferably contain 1 to 6 carbon atoms, or 1 to 4 carbon atoms. These hydrocarbon groups are Preferably alkyl (e.g., methyl, ethyl, propyl, and the like). The alkylene and alkylidene groups Preferably contain 1 to 6 carbon atoms, or 1 to 4 carbon atoms. The alkylene groups include methylene, ethylene, propylene, and the like.

In a specific aspect, the reactive groups can be derived from glycidoxypropyl tri($C_{1-3}$alkoxy)silane, glycidoxypropyl di($C_{1-3}$alkoxy) ($C_{1-3}$alkyl) silane, 2,3-epoxycyclohexyl- 4-ethyl tri(C$_{1-3}$alkoxy)silane, 2,3-epoxycyclohexyl-4-ethoxyethyl di(C$_{1-3}$alkoxy) (C$_{1-3}$alky)silane, or a combination thereof. The reactive group can be bonded at the molecular chain terminals of the polyorganosiloxane, in pendant positions on the molecular chain, or both. In another specific aspect, the reactive group is provided by combining one or more of the foregoing monomers with the curable polyorganosiloxane compositions.

The reactive organosiloxane can include reactive groups on a molar basis per mole of silicon-containing monomeric unit of 0.1 to 50 mole-percent (mol %), or 0.5 to 45 mol %, or 1 to 40 mol %, or 2 to 40 mol %, based on 100 mol % of silicon-containing monomeric units in the organosiloxane of the reactive organosiloxane.

The amount of reactive organosiloxane in the curable polysiloxane composition can vary widely depending on the reactive group and the desired properties of the elastomer. For example, the curable polysiloxane composition can comprise the 0.05 to 50 wt %, or 0.1 to 45 wt %, or 0.5 to 40 wt %, or 1 to 40 wt % reactive organosiloxane based on the total weight of the curable polysiloxane composition.

The curable polysiloxane composition can further comprise a silicone fluid, to adjust the viscosity of the curable polysiloxane composition, extend the life of the curable filled composition, or to provide specific properties to the cured product, such as softness. Suitable polyorganosiloxane fluids have a viscosity of less than 3,000 cSt. Such polyorganosiloxane fluids decrease the viscosity of the composition, thereby allowing, where desired, at least one of increased filler loading, enhanced filler wetting, and enhanced filler distribution, and improved coating and casting properties. The silicone fluid preferably does not substantially inhibit the curing reaction, i.e., the addition reaction.

The silicone fluid can be non-reactive or can co-cure with the other organosiloxane components. The boiling point of a suitable non-reactive silicone fluid is high enough such that it is dispersed in the polymer matrix, does not evaporate during or after cure, and does not migrate to the surface or outgas. It is further selected to lead to low outgassing and little or no migration to the surface during use of the cured silicone layer. A suitable non-reactive silicone fluid has a boiling point greater than or equal to 260° C. (500° F.), and can be branched or straight-chained. Examples of non-reactive silicone fluids include DC 200 from Dow Corning Corporation.

Where the silicone fluid is co-curable, the silicone fluid can become part of the polymer matrix by covalent bonding, thereby minimizing outgassing and/or surface migration. Silicone fluids can be co-curing with the alkenyl-containing polyorganosiloxane and the polyorganosiloxane having at least two silicon-bonded hydrogen atoms, and therefore can themselves contain alkenyl groups or silicon-bonded hydrogen groups. Such compounds can have the same structures as described above in connection with the alkenyl-containing polyorganosiloxane and the polyorganosiloxane having at least two silicon-bonded hydrogen atoms, but in addition have a viscosity of less than 1,000 cSt, and preferably have a boiling point greater than the curing temperature of the addition cure reaction, i.e., greater than or equal to 260° C. (500° F.).

The curable polysiloxane composition further comprises, generally as a component of the part containing the polyorganosiloxane having at least two alkenyl groups per molecule, a cure catalyst, specifically a hydrosilylation-reaction catalyst. Effective catalysts promote the addition of silicon-bonded hydrogen onto alkenyl multiple bonds to accelerate cure. Such catalyst can include a noble metal, such as, for example, platinum, rhodium, palladium, ruthenium, iridium, or a combination thereof. The catalyst can also include a support material, such as activated carbon, aluminum oxide, silicon dioxide, polymer resin, or a combination thereof. A quantity of catalyst effective to cure the silicone composition is used, which is generally 0.1 to 1,000 parts per million by weight (ppmw) of metal (e.g., platinum) based on the combined amounts of the reactive organosiloxane components.

Platinum and platinum-containing compounds are preferred, and include, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of the catalyst in a polymer resin such as methyl methacrylate, poly carbonate, polystyrene, silicone, and the like. A combination of different catalysts can also be used. Where a platinum catalyzed system is used, poisoning of the catalyst can occur, which can cause formation of an uncured or poorly cured silicone composition that is low in strength. Additional platinum can be added, but when a large amount of platinum is added to improve cure, the pot life or working time can be adversely affected. Methyl vinyl cyclics can be used as a cure retardant, for example 1-2287 Cure Inhibitor from Dow Corning. Such materials bind the platinum at room temperature to prevent cure and hence, improve the working time, but release the platinum at higher temperatures to affect cure in the required period of time. The level of platinum and cure retardant can be adjusted to alter cure time and working time/pot life. When an excess platinum level is used, it is typically less than or equal to 1 wt % of the total weight of polyorganosiloxane mixture and filler and other additives. Preferably, within this range, the additional platinum concentration (i.e., the amount over that required) is greater than or equal to 0.05 wt %, or greater than or equal to 0.15 wt % based on the total weight of polyorganosiloxane mixture. Also within this range, the additional platinum concentration is less than or equal to 0.6 wt %, or less than or equal to 0.45 wt %, depending on type and amount of filler used.

The cure retardant concentration (if a cure retardant is used) is less than or equal to 0.3 wt % of the total composition. Within this range, the cure retardant concentration is greater than or equal to 0.005 wt %, or greater than or equal to 0.025 wt % based on the total weight of the polyorganosiloxane mixture. Also within this range, the cure retardant concentration is less than or equal to 0.2 wt %, or less than or equal to 0.1 wt %, based on the total weight of curable polysiloxane composition and the required working time or pot life.

Other additives can be present in either part of the curable polysiloxane compositions, for example, ultraviolet (UV) stabilizers, antistatic agents, pigments, antimicrobial or antiviral agents, and the like, or a combination thereof. Where additives are present, the amounts used are selected so that the desired properties of the cured silicone composition are not adversely affected by the presence of the additives.

To allow the addition, incorporation, and wetting of the expanded polymer microspheres and the filler composition, the viscosity of the combined components of the curable polysiloxane composition (excluding expanded polymer microspheres and filler) is less than 100,000 cSt, or less than 85,000 cSt, or less than 75,000 cSt. Alternatively, or in addition, the combined components of the curable polysiloxane composition (excluding expanded polymer microspheres and filler) have a neat extrusion rate of less than 500 grams/minute measured according to ASTM C-603-98.

Finally, the components of the curable polysiloxane composition are selected to provide a cured foam having a low glass transition temperature (Tg), for example less than 0° C., less than −50° C., or less than −115° C.

Expanded Polymer Microspheres

In addition to the curable polysiloxane composition, the curable filled composition for the manufacture of a filled silicone foam layer further includes a plurality of expanded polymer microspheres. As used herein, "expanded polymer microspheres" refers to polymer shells encapsulating a gas and includes shells with less than a perfect spherical shape; for example, these shells have what appears to be a semi-hemispherical shape when cut open and viewed by scanning electron microscopy (SEM). The expanded polymer microspheres can act as a preconstructed foam-like cell due to the encapsulation of gas within the polymeric shell.

The encapsulated gas can include, for example, air, nitrogen, argon, carbon dioxide, or combination thereof. The gas may be an organic gas, such as isobutane, isopentane, or a combination thereof. A polymer shell holds the gas; and the polymeric; shell can hold the gas under pressure. Examples of polymer shell include thermoplastic polymers, such as polyacrylonitrile/methacrylonitrile shells and poly(vinylidene dichloride)/polyacrylonitrile shells. The shells may incorporate inorganic particles, such as silicates, calcium-containing or magnesium-containing particles, which can facilitate separation of the polymer microspheres.

It is to be understood that the microspheres used herein are expanded (i.e., pre-expanded), rather than expandable. Expandable microspheres are commercially available, and are often expanded during processing. However, it has been found that use of expandable microspheres that expand in situ during formulation or cure yield textured surfaces or undesirable surface defects. When examined by ball-drop impact testing, formulations that included the undesirable texture yielded lower in energy absorption.

The expanded polymer microspheres, in contrast, are expanded before being incorporated into the curable polysiloxane composition. The use of expanded polymer microspheres provides a mechanism reduce the effect of impact on the foam layer while maintaining consistent thicknesses at a micrometer level. The expanded polymer microspheres, upon pre-expansion can grow, for example, 10 to 60 percent to a final average diameter of 20 to 200 micrometer (μm). However, to manufacture silicone foam layers having a smooth surface, best overall results are achieved when a largest diameter of the expanded polymer microspheres is less than a thickness of the foam. Accordingly, the expanded polymer microspheres have a largest diameter of less than 300 μm, or 200 μm or less, or 150 μm or less, or 100 μm or less, or 50 micrometers or less, depending on the intended thickness of the foam. Expanded polymer microspheres that meet this absolute particle size can have a $D_{50}$ of 10 to 200 μm, or 20 to 150 μm, or 10 to 100 μm. In an aspect, the expanded polymer microspheres have a $D_{50}$ of 10 to 80 μm, for example, a $D_{50}$ of 20 to 60 μm. The expanded polymer microspheres can optionally exhibit a multimodal distribution of median particle size, provided that the maximum diameter is not exceeded.

The expanded polymer microspheres can be dry or wet upon addition to the curable filled composition, i.e., can be unsuspended or suspended in an aqueous solution, an organic solution, or a combination thereof. The expanded polymer microspheres (wet or dry) can optionally have a surface pretreatment, for example, with a silane, a fluoroalkyl, a long-chain carboxylic acid having from 8 to 30 carbon atoms, silica, calcium carbonate, or a combination thereof. The long-chain carboxylic acid can have from 10 to 20 carbon atoms, and may be branched or unbranched, saturated or unsaturated. An example includes stearic acid. The silane for pretreatment can be a reactive organofunctional silane, for example a silane having an alkenyl group, a hydroxy group, a C1-12 alkoxy group, a halide, a mercapto group, or a combination thereof. Expanded polymer microspheres with or without various surface pretreatments are commercially available under the EXPANCEL trade name from Nouryon.

The pretreated microspheres, in particular the dry pretreated microspheres, can act not only as a crush zone, but without wishing to be bound by any theory, it is believed the treatment can also act as a lubricant against other fillers present in the matrix, rather than as an adhesive. Again without wishing to be bound by any theory, it is believed that some of the energy dissipated in the silicone matrix is due to friction of the treated fillers and surfaces rubbing against one another to expel (expend) the kinetic energy as a form of heat energy, while also acting as a crush zone.

The amount of the expanded polymer microspheres in the curable filled composition can vary, depending on the silicone components, the type of expanded polymer microspheres, the amount and type of filler composition as described below, and the desired properties. The amount of the expanded polymer microspheres can further be based on volume fraction calculations that show the amount yielding the best impact absorption and dissipating the highest number of Joules from the kinetic energy of the impact. For example, the curable filled composition can be included in an amount of 0.1 to 10 parts by weight (pbw), or 0.5 to 8 pbw, or 1 to 5 pbw, each based on the total weight of the curable filled composition.

Particulate Filler Composition

In addition to the expanded polymer microspheres, the curable filled composition for the manufacture of the thin silicone foams includes a particulate filler composition. Again, in order to manufacture silicone foam layers having a smooth surface, the largest dimension of each of the fillers used is or 200 μm or less, or 150 μm or less, or 100 μm or less, or 50 micrometers or less, depending on the intended thickness of the foam. The diameter (which as defined herein can mean equivalent spherical diameter) of particulate filler compositions that can meet this absolute particle size can have $D_{50}$ of 100 micrometers or less, or 70 micrometers or less. The diameter of suitable particular filler compositions can accordingly have a $D_{50}$ of 10 to 100 μm, or 20 to 100 μm. In an aspect, the diameter of a particulate filler composition has a $D_{50}$ of 10 to 80 μm, for example, a $D_{50}$ of 20 to 60 μm. The particulate filler composition can optionally exhibit a multimodal distribution of median particle size, provided that the maximum diameter is not exceeded. A multimodal distribution can be a result of using two different particulate fillers, or a single filler with two or more modes.

Possible fillers for use in the filler composition are particulate, can include an inorganic filler such as a ceramic, a clay, a silicate, a plurality of ceramic or glass microspheres; or an organic filler such as a polymeric silsesquioxane or methyl-phenyl MQ resin; or a combination thereof.

In an aspect, the particles can be of any regular or irregular shape, for example, discs, fibers, flakes, platelets, rods (solid or hollow) spherical (solid or hollow), or whiskers. In another aspect, the particles are of a shape and modulus that can render them more susceptible to crushing, and provide improved crushing properties. Such shapes include, for example, platelets and hollow rods.

A suitable organic filler is particulate paraffin wax. As is known in the art, paraffin wax includes a mixture of solid straight-chain hydrocarbons ranging in melting point from 48° to 66° C. (120° to 150° F.). Paraffin wax can be obtained from petroleum by dewaxing light lubricating oil stocks.

Suitable inorganic fillers include alumina, alumina trihydrate, aluminum nitride, aluminum silicate, barium titanate, beryllia, boron nitride, calcium carbonate, corundum, magnesia, magnesium hydroxide, glass, mica, nanoclay, quartz, silicon carbide, strontium titanate, talc, titanium dioxide (such as rutile and anatase), wollastonite, and the like.

In an aspect, the filler composition includes silica, such as fumed silica. Calcium carbonate can be used.

In an aspect the filler composition includes a clay having a platy, layered morphology, such as kaolin. Kaolin is an aluminosilicate hydrate commercially available from a number of sources. Use of a hexagonal platy can introduce a unique geometry to the system to increase the presence of potential crush zones.

In another aspect, a clay having a hollow tubular morphology can be used, to act specifically as a crush zone. The clay in combination with the hollow tube geometry can make this filler an excellent energy absorber since the modulus of a hollow tube is low and fairly easy to break under certain impact test conditions. The clay can be halloysite, an aluminosilicate clay exhibiting hollow tubular nanostructure. Halloysite tubes have a length in the range of 0.5 to less than 3.0 μm, an exterior diameter in the range of 50 to 70 nanometers and an internal diameter (lumen) in the range of 15 to 30 nanometers. Halloysite is chemically the same as kaolin clay ($Al_2Si_2O_5(OH)_4 \times nH_2O$) with one layer of water molecules existing between layers of alumina and silica. Halloysite is commercially available under the DRAGONITE™ brand name by Applied Materials, Inc.

In another aspect, the filler composition includes glass or ceramic microspheres, in particular hollow glass microspheres, i.e., hollow spherical glass particles made from a glass such as an alkali borosilicate glass such as a sodium borosilicate glass. The hollow glass microspheres can have a low specific gravity, good heat resistance, heat insulating properties, pressure-resistance (e.g., crush strength) and impact resistance. Each of the hollow glass microspheres can have an essentially spherical form and an essentially spherical inner void. The hollow glass microspheres can have average diameters from 10 to 200 μm.

In another aspect, a polyhedral oligomeric silsesquioxane (commonly referred to as "POSS") can be in the filler composition. POSS is a nano-sized inorganic material with a silica core that can have inert or reactive functional groups on the surface. The silsesquioxane can have a cube or a cube-like structure comprising silicon atoms at the vertices and interconnecting oxygen atoms. Each of the silicon atoms can be covalently bonded to a pendent R group. The silsesquioxane can be substituted or unsubstituted, such that each R group independently can be a hydrogen, a hydroxy group, an alkyl group, an aryl group, or an alkenyl group, where the R group can have one to twelve carbon atoms and one or more heteroatoms (for example, at least one of oxygen, nitrogen, phosphorus, silicon, or a halogen). Each R group independently can include one or more reactive groups such as at least one of an alcohol, an epoxy group, an ester, an amine, a ketone, an ether, a halide, or a combination thereof. Each R group independently can comprise at least one of a silanol, an alkoxide, or a chloride. In aspect, one or all of the R groups is hydrogen, methyl, or a combination thereof. An example of a silsesquioxane is octa(dimethylsiloxy) silsesquioxane.

One or more of the foregoing fillers can be dry or wet, and can optionally have a surface pretreatment, for example, with a silane, fluoroalkyl, a long-chain carboxylic acid having from 10 to 30 carbon atoms such as stearic acid, silica, calcium carbonate, or a combination thereof. As with the expanded polymer microspheres, in particular the dry, pretreated microspheres, such fillers can act not only as a crush zone but without wishing to be bound by any theory, it is believed the pretreatment can also act as a lubricant against other fillers present in the matrix, rather than as an adhesive. Again without wishing to be bound by any theory, it is believed that some of the energy dissipated in the silicone matrix is due to friction of the pretreated fillers and surfaces rubbing against one another to expel the kinetic energy as a form of heat energy, while also acting as a crush zone. In another advantageous feature, use of a surface pretreatment can improve dispersion of the fillers in the curable filled composition, and allow higher expanded microsphere and filler loading. Especially where dispersion is not entirely uniform, the surface pretreatment can act as a safeguard for energy dissipation in formulations containing over 3% volume fraction of the filled silicone foam layer.

Finally, the filler composition can include a particulate methylphenyl silicone resin, i.e., methyl phenyl MQ resin wherein M" is $R_3SiO$ and Q is $SiO_4$ units, and R is a combination of methyl and phenyl. It has been unexpectedly found that the presence of the methyl phenyl MQ resin provides improved energy absorption impact. The concentration of phenyl groups present in the MQ resin is thus optimized to drive up the energy absorption from impact.

The methyl phenyl MQ resin is solid at room temperature, and can be in powder or flake form. The methyl phenyl MQ resin can be provided in combination with an alkenyl-terminated organosiloxane as described above for ease of handling. Although the methyl phenyl MQ resin is provided as a particulate solid to the curable filled composition, the component containing the alkenyl-terminated organosiloxane, the curable polyorganosiloxane composition, or the curable filled composition can be processed to at least partly or fully dissolve the particles. For example, the component containing the alkenyl-terminated organosiloxane can be formed by shear blending the various ingredients, including the methyl phenyl MQ resin, at temperature of 80° C. for 4 hours, melting resin flake in vessel and blending into a polymer, or using a solvent such as benzene or toluene to improve solubility and then stripping the solvent after blending.

Method of Manufacture

The curable filled composition can be manufactured by combining the various components in any suitable order. In an aspect, the components including the alkenyl-substituted polyorganosiloxane, catalyst, fillers, and any additives are mixed as a first part, then combined with the hydride-containing polyorganosiloxane as a second part.

The curable filled composition can have a pot life of several minutes to over a week, depending on the composition and method of cure used. As used herein, the term "pot life" means the amount of time that can transpire from the time the curing process is initiated (e.g., by combining co-curable components in the presence of a catalyst) to the time wherein the cure has advanced to the point where desirable properties of flow and/or workability are no longer in a useful range for the manufacturing process, to provide a suitable product. Properties affected by the pot life of the silicone composition include, for example, extrudability, flow, coat quality, coat uniformity, coating thickness, and number of defects. The pot life is typically assessed at room temperature, and can be, in an aspect, greater than or equal to 4 hours, or greater than or equal to 6 hours, or greater than or equal to 8 hours, or greater than or equal to 10 hours, or greater than or equal to 12 hours, as measured from the point of initial contact of the co-curable components of the silicone composition with any suitable catalyst. In a specific aspect, the silicone composition has a pot life of 12 hours to 9 days.

The filled silicone foam layer can be formed by casting the curable filled composition, followed by cure of the cast composition. A convenient method for preparing the filled silicone foam layer from the curable filled compositions comprises mixing the different components to homogeneity and removing air by degassing under vacuum.

The cure time of the curable filled composition is desirably short at elevated temperatures. Thus a cure time at elevated temperature of 1 to 25 minutes, or 5 to 20 minutes, or 7 to 15 minutes, or 10 to 12 minutes is useful. Such cure times are desirable where rapid, efficient mixing, heating, and/or curing, and automated dispensing of the composition are used.

A suitable curable filled composition can have, relative to a faster curing silicone composition with a short pot life, a lower level of curing agent, higher level of catalyst inhibitor, higher content by weight of active crosslinking groups (such as alkenyl groups and active silicon hydride groups) in the silicone composition, or a combination thereof, sufficient to increase the room temperature cure time from 1 to 20 minutes to greater than or equal to 7 days. Where the cure time at room temperature is increased to this extent, temperature or other means of effecting cure can permit a controllable, shorter working lifetime that is suitable for use with manufacturing processes that require manipulation of a silicone composition pre-cure, with cure effected under a controllable set of conditions. Use of heat, ultraviolet radiation, visible light radiation, pressure, or a combination thereof, can be used to effect curing. In an aspect, the curable filled composition is cured at a temperature of greater than or equal to 80° C., or greater than or equal to 90° C., or greater than or equal to 100° C., or greater than or equal to 125° C., or greater than or equal to 150° C. A suitable curable filled composition can permit a working lifetime at 100° C. of less than 30 minutes, or less than 25 minutes, or less than 20 minutes, or less than or equal to 15 minutes. In another aspect, a suitable curable filled composition can permit a working lifetime at 125° C. of less than 12 minutes, or less than 10 minutes, or less than 9 minutes, or less than 8 minutes. In another aspect, a suitable curable filled composition can permit a working lifetime at 150° C. of less than 10 minutes, or less than 8 minutes, or less than 6 minutes, and or less than 5 minutes.

Alternatively, a stepped cure process can be used, for example a first cure at a lower temperature (e.g., 60 to 80° C.) for a first period of time (e.g., 5 to 15 minutes), followed by a higher temperature cure (e.g., 90 to 130° C.) for a second period of time (e.g., 5 to 20 minutes. Post-curing can be used with any of the foregoing cure regimes, for example at 80 to 150° C., or 100 to 140° C. for a period of time (e.g., 30 minutes to 3 hours). Post-cure is especially useful to enhance adhesion of the silicone foam layer to any suitable backing layer.

The curable filled composition can be cast onto a backing layer, adhesive composition, or release liner, and cured by holding the composition at room temperature (e.g., 25° C.), or by heating as described above. When a non-reactive organosiloxane fluid is present, cure is at a temperature below the boiling point of the fluid so as to substantially prevent removal of the fluid during cure. Preferably, cure temperatures are at least 20° C., or at least 50° C., or at least 80° C. below the boiling point of the fluid component. When using reactive fluid, the cure temperature is such that the fluid cures before it can be driven off. An optional post-cure operation can be used. Where the cured silicone layer is formed onto a carrier, it can be coated with an adhesive or transferred to a backing layer. Transfer can be by laminating, rolling, or calendaring.

In a continuous method, the curable filled composition is transferred onto a moving carrier. Another layer of carrier film is optionally pulled through on top of the mixture and the sandwiched mixture is then pulled through a coater, which determines the thickness of the final elastomer. The composition is then cured, followed by an optional post-cure. In an aspect, for ease of subsequent manufacture and lower cost, continuous manufacture in a roll form is used. This allows the manufacture of the filled silicone layer from a liquid composition by casting continuous rolls in sheet form at varying thicknesses, with better thickness tolerance.

Preferably a smooth (untextured release) layer is be used. Optionally an adhesive can be applied to the side of the release layer opposite the curable filled composition. Alternatively, the curable filled composition is cast onto a release layer, and the backing layer is applied to the opposite side before cure. In another aspect the backing layer applied to the opposite side before cure includes an adhesive and a release liner. Use of two backing layers is advantageous where one layer could inhibit cure of the silicone composition. For example, if the curable filled composition is disposed directly onto a polyurethane backing layer during or prior to cure, complete cure of the silicone composition can be inhibited. Increasing the amount of cure catalyst, decreasing the inhibitor loading where possible, passivating the surface of the polyurethane, or increasing the amount of reactive sites in the silicone composition can be used to overcome any decreased reactivity at the interface between a curing silicone composition and a polyurethane. Alternatively, where appropriate, use of a backing layer between the curable filled composition and a polyurethane can overcome any difficulties with curing, specifically where the backing layer does not possess reactive functional groups that can interfere with the curing of the silicone composition.

After cure, in an aspect, the filled silicone foam layer is imbibed with a liquid to further improve impact performance, for example water, a nonreactive solvent, or a low molecular weight silicone oil. In an aspect a low molecular weight, nonreactive silicone oil is imbibed to further improve impact performance. A silicone oil can absorb a large quantity of energy from impact without translating the energy to the adjacent side or within the silicone matrix. Suitable oils are nonreactive, and can have a viscosity of less than 1,000 cSt, or less than 750 cSt, or less than 600 cSt, or less than 500 cSt. Exemplary silicone oils include dimethylsilicone oils, methylphenylsilicone oils, diphenylsilicone oils and methylhydrogensilicone oils. Particularly useful silicone oils are generally homopolymers, in particular dimethylsiloxanes. Other useful silicone oils include alkyl- or fluoroalkyl-modified silicone oils, polyether-modified silicone oils, methyl styryl-modified silicone oils, alkyl-modified silicone oils, fatty acid-modified silicone oils, alkoxyl-modified silicone oils and fluorine-modified silicone oil; and straight silicone oils such as fluorine-modified silicone oil. The silicone oil can be imbibed by dipping, coating, soaking, or other techniques that does not significantly swell the filled silicone layer beyond the desired thickness. For example, the foam layer can be place in the silicone oil under a vacuum for a suitable length of time.

Filled Silicone Foam Layer Properties

The cured, filled silicone obtained from the curable filled composition is a flexible and compressible foam. As used herein, "foam" refers to materials having a cellular structure. The cured silicone foams can have densities of, for example, less than 55 pounds per cubic foot (pcf) (881 kilograms per cubic meter (kg/m$^3$)), or less than 25 pcf (200 kg/m$^3$), a void volume content of at least 5 to 99%, preferably greater than or equal to 30%, based upon the total volume of the silicone foam, or a combination thereof. The density of the foam can be measured on a thicker sample of the foam, for example a sheet having a thickness of one inch (2.54 centimeters (cm)).

The filled silicone foam layer advantageously is very thin, and yet retains excellent impact properties. The filled silicone foam layer can have a thickness of 20 to 300 μm, or 40 to 200 μm, or 50 to 250 μm, preferably 60 to 200 μm.

The filled silicone foam can maintain its elastic behavior over many cycles on compression deflection over the life of the foam, properties reflected by compressive force deflection and compression set of the foam. Foams with good compression set resistance provide cushioning and maintain their original shape or thickness under loads for extended periods. In an aspect, the filled silicone foam has a compression force deflection of 0 to 25 pounds per square inch (psi) (0 to 172 kilopascals (kPa)), preferably 0 to 15 psi (0 to 103 kPa), each at 25% deflection and determined in accordance with ASTM D3574-17. The filled silicone foam can have a compression set of 0 to 5%, determined in accordance with ASTM D 3574-95 Test D at 70° C.

To determine the suitability of the filled silicone foam for impact absorption, a ball drop test can be performed as described in the Examples. A stainless steel 4.5 gram (g) ball and a distance to impact of 0.1 meters (m) can be used. Other steel ball masses and distances to impact, such as a 28.5 g steel ball at 0.3 m can be used to show that the foams are useful under more severe conditions.

The filled silicone foam can have low water absorption, for example a water absorption of less than 5 wt %, or less than 3 wt %, or less than 2 wt %, as determined by heating a sample at 50° C. for 24 hours, then submersing the sample in water for 30 seconds at room temperature, and determining the weight of the water absorbed. In an aspect water absorption can be determined by cutting a sample size of 100 mm×100 mm sample, storing at 50° C. at least 24 hours, then weighing the sample as W1. The sample is immersed into water at room temperature for 30 seconds, and remove from the water. Water is removed from the surface of the sample, and its weight recorded as W2. Percent water absorption is calculated using the equation ((W2−W1)/W1)*100.

The filled silicone foam can have a combination of a compressive force deflection of 0 to 25 pounds per square inch (0 to 172 kilopascals), preferably 0 to 15 pounds per square inch (0 to 103 kilopascals), at 25% deflection and determined in accordance with ASTM D3574-17, and a compression set of 0 to 5%, determined in accordance with ASTM D 3574-95 Test D at 70° C.

In an aspect the filled silicone foam can have a combination of the foregoing properties, for example a low glass transition temperature, for example less than −115° C., low compression set, for example 0 to 5% determined in accordance with ASTM D 3574-95 Test D at 70° C., a compressive force deflection of 0 to 15 psi (0 to 103 kPa) at 25% deflection and determined in accordance with ASTM D3574-1, and low water absorption, for example, less than 2 wt % determined as described above.

In a preferred aspect, the filled silicone foam layer has a thickness of 60 to 200 μm and is formed from a high molecular weight vinyl-terminated polydimethylsiloxane (PDMS), 3 to 7 wt %, preferably 4 to 6 wt % of a lower weight vinyl-terminated poly(methyl phenyl) siloxane, 0.5 to 2 wt %, or 0.8 to 1.2 wt % of dry, optionally treated preexpanded polymer microspheres, 1 to 3 wt %, preferably 1.8 to 2.2 wt % of a kaolin clay, preferably kaolin having a hollow tube nanostructure, each based on the total weight of the filled silicone foam layer.

In another preferred aspect, the filled silicone foam layer has a thickness of 60 to 200 μm and is formed from a high molecular weight vinyl-terminated PDMS, 3 to 7 wt %, preferably 4 to 6 wt % of a lower weight vinyl-terminated poly(methyl phenyl) siloxane, 0.5 to 2 wt %, or 0.8 to 1.2 wt % of dry, silica-treated preexpanded polymer microspheres, 2 to 8 wt %, preferably 3 to 7 wt % of a stearic acid-treated calcium carbonate, and 2 to 8 wt %, preferably 3 to 7 wt % of a vinyl-terminated silane-treated hexagonal platy kaolin, each based on the total weight of the filled silicone foam layer.

The silicone foam layers are especially useful in electronic devices having a screen, such as portable or hand-held electronic devices. A particularly useful application is in hand-held devices with liquid crystal display (LCD) or OLED screens. The screens can be flexible, that is, bendable, rollable, foldable, or the like. The various layers in such devices are known, and can fully or partially cover each other. It is also understood that the various layers can be in direct physical contact with neighboring layers (disposed directly on) or disposed on each other such that any suitable intervening layer can be present, for example an adhesive layer.

Without wishing to be bound by any theory, it is believed that the current inventors have developed formulations that provide "crush zones," crush zone geometry, the importance of thermal performance across a wide range of temperatures, optimal loading levels for minimal particle to particle interaction, and friction of coated fillers rubbing against each other in a highly filled media act as a mode for dissipating the most amount of energy on a micrometer level. The prior art, in contrast, addresses the thermal properties of given materials, specifically the glass transition temperature and the inherent elastomeric properties to mitigate impact upon initial contact, as well as properties such as hardness, density, and filler content to mitigate impact.

In summary, the filled silicone foam layer is a singular layer of silicone foam that includes expanded polymer microspheres, and a specific filler package combination that provide "crush zones" at a micrometer level and are capable of significantly reducing, dissipating, or absorbing the energy of impact. The polymer microsphere and filler package are dispersed within a matrix of polydimethylsiloxane using a hydrosilylation cure package to form into a solid, yet porous silicone sheet. The concentration of phenyl groups present in the components of the curable filled composition is thus optimized to drive up the energy absorption from impact. The microspheres and fillers contained in the silicone foam are present at a certain concentration and combination to promote optimal interaction with the silicone chains, therefore allowing the crush zone to absorb as much of the impact as possible. The use of silicone as the medium or network forming polymer provides many advantages that meet current market needs, such as softness and the ability to perform the same under a variety of thermal conditions. It also enables a much higher level of filler loadings that would be unachievable in, for example, polyurethane foams, (meth)acrylate, or hybrid (meth)acrylate polymer systems of the prior art. These prior art compositions further have poor compression set, higher water absorption and higher Tgs than the filled silicone foams, rendering them more sensitive to thermal changes, particularly low temperatures.

The following examples are merely illustrative and are not intended to limit compositions, layers, or articles made to the materials, conditions, or process parameters set forth in the Examples.

EXAMPLES

Materials

The following materials were used in the Examples

| Name | Trade Name (Source) | Description |
|---|---|---|
| Vi-100000 | FLD 621V100000, | Vinyl-terminated PDMS, 100,000 cSt |
| Vi-6000 | FLD 621V60000 | Vinyl-terminated PDMS, 60,000 cSt |
| Vi-350 | FLD 621V350 | Vinyl-terminated PDMS, 350 cSt |
| Vi-600 | FLD 621V600 | Vinyl-terminated PDMS, 600 cSt |
| Vi-15DPS/DMS-10000/ | PDV-1641 | Vinyl-terminated poly(15-17% diphenyl siloxane-dimethyl siloxane), 10,000 cSt |
| Vi-3DPDMS-60000 | PDV-0346 | Vinyl-terminated poly(3.0-3.5% diphenylsiloxane-dimethylsiloxane), 60,000 cSt |
| Vi-15DP/DMS-5000 | PDV-1635 | Vinyl-terminated poly(15-17% diphenylsiloxane-dimethylsiloxane), 5,000 cSt |
| Vi-DPS/MPS/DMS | SiSiB ® VF 6800-2500 | Vinyl-terminated poly(dimethylsiloxane-methylphenylsiloxane-diphenylsiloxane), 2,500 cSt |
| Vi-DPS/MPS/DMS mixture | SiB ® VF 6800-2500 mixture with PDV-0346 | Mixture of Vinyl-terminated poly(dimethylsiloxane-methylphenylsiloxane-diphenylsiloxane), 2,500 cSt with Vinyl-terminated poly(3.0-3.5% diphenylsiloxane-dimethylsiloxane), 60,000 cSt |
| Vi-copolymer, low | FLD 50620W | Vinyl-terminated dimethylsiloxane copolymer, low viscosity, 400 cSt |
| Curing agent | | Trimethylsilyl-terminated methylhydrosiloxane-dimethylsiloxane copolymer CAS No. 68037-59-2 |
| Pt-cat | PT 56710C | Platinum-containing catalyst complex with inhibitor |
| ExD | Expancel 551 DE 30 d42 (Nouryon) | Dry, expanded polymer microspheres(particle size 25-50 micrometers (μm), density 42 +/− 2 kg/m$^3$) |
| ExDT | Expancel 461 DET 40 d25_(Nouryon) | Dry, expanded, $SiO_2$-treated microspheres (particle size 35-55 μm, density 25 +/− 3 kg/m$^3$) |
| ExW | Expancel W (Nouryon) | Wet, expanded polymer microspheres(in water for easy dispersion) |
| GMS | 3M K15 glass spheres | Borosilicate glass microspheres, 60 nanometer (nm) size |
| St-$CaCO_3$ | Winnofil SPM | Stearic acid-treated calcium carbonate |
| VSi-kaolin | Polarite 503-S | Vinyl silane-treated calcined kaolin (hexagonal platy hydrous aluminosilicate clay) |
| $SiO_2$-1 | TPX-5030 | HDMZ-treated fumed silica (colloidal silica, 115 nm particle size) |
| $SiO_2$-2 | TS-530 | HDMZ-treated fumed silica (8 nm particle size) |
| $SiO_2$-3 | Aerosil | Hydrophilic fumed silica |
| Halloysite | Dragonite HP | Halloysite (aluminosilicate clay) in high density polyethylene (HDPE) |
| POSS | | Methyl-substituted polyhedral oligomeric silsesquioxane (POSS) |
| MQ | XJY-8205A | Silicone methyl MQ (CAS No. 68988-56-7), powder |
| | XYJ 8010A | Flake methyl phenyl silicone, containing 25:75 methyl phenyl silicone:vinyl-terminated PDMS (V100k) |
| Inhibitor | DC1-2287 | Methyl vinyl-cyclic-D4 siloxane (MV-CYC-4) |

Methods

The silicone layers were prepared by combining the components shown in the formulations below, followed by layer formation. The amount of each component is in parts by weight, with the total weight of the listed components also shown. Each formulation further included 0.00163 parts by weight of an inhibitor (DC1-2287), which is additional to the indicated total weight. Any percentage values are in weight percent.

Unless indicated otherwise, the components for each example were mixed by hand to form a first part including the alkenyl-containing polyorganosiloxane, catalyst, additive and filler, and a second part including the hydride-containing polyorganosiloxane as the curing agent. The first and second parts were combined in a weight ratio of first part: second part of 25:1 to 100:1. The formulation was then coated onto a roll-over-roll coater between two layers of release liner, and cured between 70° C. and 130° C., for example, for 10 to 25 minutes, to form a layer having a thickness equal to a desired final thickness (no chemical blowing was used).

The cured layers were tested using a ball-drop apparatus, where following accepted practice, the cured silicone foam layer was positioned on a load sensor connected to a high frequency Data Acquisition (DAQ) and force measurement software. The load sensor was placed in the ball drop test fixture with the stainless steel 4.5 gram (g) ball placed and dropped 0.1 meter (m) above the sample. The software then registers and reports a force reading, which is then compared against the control ball drop with no foam/elastomer sample present. Other steel ball masses and distance to impact, such as a 28.5 g steel ball at 0.3 meters (m), were also tested. In the Tables below, "Pass" indicates a passing result in the ball-drop apparatus, and "Fail" indicates a failing result. If no Pass or Fail indication is given, the sample was not evaluated in this test.

Formulations and Results

Table 1 shows formulations including a vinyl silicon polymer with increasing amounts of a wet, expanded polymer microsphere.

TABLE 1

| Component | 1<br>2.5% ExW* | 2<br>3% ExW* | 3<br>4% ExW* | 4<br>0% ExW* |
|---|---|---|---|---|
| Vi-60000 | 0.7311 | 0.7270 | 0.7199 | 0.7499 |
| Vi-100000 | 0.2437 | 0.2430 | 0.2400 | 0.2500 |
| Pt-cat | 0.000163 | 0.000163 | 0.000163 | 0.000163 |
| ExW | 0.025 | 0.03 | 0.04 | –0 |
| Total | 1.000 | 1.000 | 1.000 | 1.000 |
| Pass/Fail | Fail | Fail | Fail | Fail |

*Control

As can be seen from Table 1, all samples failed in the absence of a filler composition.

Table 2 shows formulations including a curable polyorganosiloxane composition containing one of three different types of phenyl-containing siloxane, with the same amount of a wet, expanded polymer microsphere. The formulations can further include a particulate filler with or without a low viscosity copolymer.

TABLE 2

| Component | 5<br>3% + 5%<br>Phenyl* | 6<br>3% + 20%<br>Phenyl* | 7<br>3% + 20%<br>Phenyl +<br>10% CaCO3 | 8<br>3% + 20%<br>Phenyl +<br>10% Silica | 9<br>3% + 20%<br>Phenyl +<br>10% Mixed<br>Filler | 10<br>3% + 20%<br>Phenyl +<br>10% CaCO3^ | 11<br>3% + 20%<br>Phenyl +<br>10% CaCO3^ +<br>low visc.<br>copolymer |
|---|---|---|---|---|---|---|---|
| Vinyl silicone | 0.6899 | 0.577 | 0.5024 | 0.5024 | 0.5024 | 0.5061 | 0.5061 |
| Vinyl silicone | 0.2300 | 0.192 | 0.1675 | 0.1675 | 0.1675 | 0.1687 | 0.1487 |
| Vinyl silicone | — | — | — | — | — | 0.04 | 0.04 |
| Pt-cat | 0.000163 | 0.000163 | 0.000163 | 0.000163 | 0.000163 | 0.000163 | 0.000163 |
| Vi-15DP/DMS-10000/ | 0.05 | 0.2 | 0.2 | 0.2 | 0.2 | — | — |
| Vi-DP/MP/DMS | — | — | — | — | — | 0.105 | — |
| Vi-DP/MP/DMS mixture | — | — | — | — | — | — | 0.105 |
| Vi-copolymer, low | — | — | — | — | — | — | 0.02 |
| ExW | 0.03 | 0.03 | 0.03 | 0.03 | 0.03 | 0.03 | 0.03 |
| St-CaCO3 | — | — | 0.1 | — | 0.05 | 0.15 | 0.15 |
| SiO2-1 | — | — | — | 0.1 | 0.05 | — | — |
| Total pbw | 1.000 | 1.000 | 1.000 | 1.000 | 1.0000 | 1.0000 | 1.0000 |
| Pass/Fail | Pass | | | Pass | | | |

*Control

^Run at large scale (greater than 100 feet)

As can be seen from Table 2, use of a high volume of wet expanded polymer microspheres can provide passing results in a ball-drop test. However, to obtain a desirable combination of properties, a combination of expanded polymer microspheres and filler were tested. Use of a calcium carbonate filler with a vinyl siloxane having phenyl backbone groups also provided a passing result in a ball-drop test.

Table 3 shows formulations including curable polyorganosiloxane composition including a low viscosity vinyl-containing organosiloxane (Vi-350), the same amount of a wet, expanded polymer microsphere, and with and without a calcium carbonate particulate filler.

TABLE 3

| Component | 12<br>Vi-350 | 13<br>Vi-350 No Filler* |
|---|---|---|
| Vi-100000 | 0.5024 | 0.6132 |
| Vi-350 | 0.1675 | 0.3066 |
| Pt-cat | 0.000163 | 0.000163 |
| ExW | 0.03 | 0.03 |
| Vi-DPS/MPS/DMS | 0.2 | |
| Vi-15DPS/DMS-10000/ | | 0.05 |
| St-CaCO3 | 0.1 | |
| Total pbw | 1.0000 | 1.000 |
| Pass/Fail | Fail | Fail |

*Control

As can be seen from Table 3, both samples failed the ball drop apparatus test.

Table 4 shows formulations including a curable polyorganosiloxane composition optionally including a phenyl-substituted silicone with dry, treated expanded polymer microsphere or wet expanded polymer microspheres, and optionally a filler composition (one or more of calcium carbonate, kaolin, fumed silica, or a POSS). Some formulations further included a low viscosity copolymer.

TABLE 4

| Component | 14* ExDT | 15* ExDT #2 | 16 ExW #2 | 17 ExDT + CaCO3 | 18 ExDT + POSS + Silica | 19 ExDT + CaCO3 + Kaolin | 20 ExDT + POSS + CaCO3 | 21 ExDT + Aerosil |
|---|---|---|---|---|---|---|---|---|
| Vi-60000 | 0.6988 | 0.7011 | 0.7011 | 0.6674 | 0.6699 | 0.6223 | 0.6374 | 0.6598 |
| Vi-100000 | 0.2470 | 0.2337 | 0.2337 | 0.2225 | 0.2199 | 0.2075 | 0.2124 | 0.2200 |
| Pt-cat | 0.000163 | 0.000163 | 0.000163 | 0.000163 | 0.000163 | 0.000163 | 0.000163 | 0.000163 |
| ExDT | 0.004 | 0.015 | — | 0.01 | 0.02 | 0.01 | 0.01 | 0.01 |
| ExW | — | — | 0.015 | — | — | — | — | — |
| Vi-3DPDMS-60000 | 0.05 | — | — | — | — | — | — | — |
| Vi-15DP/DMS-5000 | — | 0.05 | 0.05 | 0.05 | 0.05 | 0.05 | 0.05 | 0.05 |
| Vi-copolymer, low | — | — | — | — | 0.01 | 0.01 | 0.01 | 0.01 |
| St-CaCO$_3$ | — | — | — | 0.05 | — | 0.05 | 0.05 | — |
| SiO2-2 | — | — | — | — | 0.02 | — | — | — |
| SiO2-3 | — | — | — | — | — | — | — | 0.05 |
| Kaolin | — | — | — | — | — | 0.05 | — | — |
| POSS | — | — | — | — | 0.01 | — | 0.03 | — |
| Total pbw | 1.0000 | 1.0000 | 1.0000 | 1.0001 | 1.0000 | 1.0000 | 1.0000 | 1.0000 |
| Pass/Fail | Pass | Pass | Pass | | | Pass | Pass | Pass |

*Control

Table 5 shows that formulations including a curable polyorganosiloxane composition including a phenyl-containing silicone with expanded polymer microspheres, optional low viscosity copolymer, and optionally a filler composition (calcium carbonate, kaolin, or fumed silica) can pass the ball-drop test.

TABLE 5

| Component | 2 DET + MQ + CaCO3 | 23* DET + MQ (No Filler) | 24 ExDT + MQ + silica | 25 ExDT + MQ + Kaolin |
|---|---|---|---|---|
| Vi-60000 | 0.4900 | 0.4900 | 0.6074 | 0.6074 |
| Vi-100000 | 0.2000 | 0.2500 | 0.2025 | 0.2025 |
| Pt-cat | 0.000163 | 0.000163 | 0.000163 | 0.000163 |
| Vi-15DP/DMS-5000 | 0.05 | 0.05 | 0.05 | 0.05 |
| Vi-copolymer, low | — | — | 0.01 | 0.01 |
| ExDT | 0.01 | 0.005 | 0.01 | 0.01 |
| St-CaCO3 | 0.05 | — | — | — |
| SiO2-2 | — | — | 0.02 | — |
| Kaolin | — | — | — | 0.02 |
| Phenyl methyl MQ | 0.2 | 0.2 | 0.1 | 0.1 |
| Total pbw | 1.0002 | 0.9952 | 1.0001 | 1.0001 |
| Pass/Fail | | | Pass | Pass |

*Control

As can be seen from Table 5, both samples containing fumed silica and kaolin were tested and passed.

Table 6 shows formulations including a curable polyorganosiloxane composition with dry, untreated expanded polymer microspheres, and one of no kaolin, kaolin, or a solid phenyl methyl MQ polymer.

TABLE 6

| Component | 26* ExD | 27 ExD + Kaolin | 28 ExD + Methyl MQ |
|---|---|---|---|
| Vi-60000 | 0.7011 | 0.6636 | 0.5511 |
| Vi-100000 | 0.2337 | 0.2212 | 0.1837 |
| Pt-cat | 0.000163 | 0.000163 | 0.000163 |
| ExD | 0.015 | 0.015 | 0.015 |
| Kaolin | — | 0.05 | — |
| Phenyl methyl MQ | — | — | 0.2 |
| Total pbw | 1.0000 | 1.0000 | 1.0000 |
| Pass/Fail | Pass | Pass | Pass |

*Control

As can be seen from Table 6, all samples passed a ball-drop test.

Table 7 shows formulations including a curable polyorganosiloxane composition including a phenyl-containing silicone with either dry, treated expanded polymer microspheres or wet expanded polymer microspheres. The compositions further optionally include glass microspheres, calcium carbonate, kaolin, fumed silica, POSS, or a combination thereof. Some formulations further included a low viscosity copolymer.

Samples marked with a "†" in Table 7 are "packed", that is, contain a higher amount of expanded polymer microspheres, filler, or both (up to about 2% by volume of the entire composition).

TABLE 7

| Component | 29†,* ExDT† (No Filler) | 30 ExDT + High Ph + CaCO3 + Silica | 31† ExDT + CaCO3 + Silica + POSS | 32 ExDT + GMS | 33 ExDT + GMS + fumed silica | 34 GMS (only) |
|---|---|---|---|---|---|---|
| Vi-60000 | 0.2287 | 0.5999 | 0.5324 | 0.6449 | 0.6299 | 0.6636 |
| Vi-100000 | 0.6861 | 0.1999 | 0.1774 | 0.2149 | 0.2149 | 0.2212 |

TABLE 7-continued

| Component | | | | | | |
|---|---|---|---|---|---|---|
| Pt-cat | 0.000163 | 0.000163 | 0.000163 | 0.000163 | 0.000163 | 0.000163 |
| ExDT | 0.02 | 0.01 | 0.01 | 0.015 | 0.015 | — |
| ExW | — | — | — | — | — | — |
| Vi-DPS/ MPS/DMS | 0.05 | 0.12 | 0.1 | 0.11 | 0.1 | 0.1 |
| Vi-copolymer, low | 0.01 | 0.01 | 0.01 | — | — | — |
| GMS | — | — | — | 0.015 | 0.015 | 0.015 |
| CaCO3 | — | 0.03 | 0.05 | — | — | — |
| Kaolin | — | — | — | — | — | — |
| SiO2-1 | — | 0.03 | 0.02 | — | — | — |
| SiO2-3 | — | — | 0.1 | — | 0.3 | — |
| POSS | — | — | 0.02 | — | — | — |
| Total pbw | 0.9950 | 1.0000 | 1.0000 | 1.0000 | 1.0000 | 1.0000 |
| Pass/Fail | | | | Fail | | Fail |

| Component | 35 ExDT + GMS | 36† ExDT + GMS + CaCO3 + SiO2 + POSS (no Vi-60000) | 37† ExW + GMS + CaCO3 + SiO2 + POSS (no Vi-60000) | 38† ExDT + Silica + POSS (no Vi-100000) | 39 ExW + GMS | 40 ExW + GMS + Kaolin |
|---|---|---|---|---|---|---|
| Vi-60000 | 0.6599 | — | — | 0.7848 | 0.6674 | 0.6298 |
| Vi-100000 | 0.2199 | 0.7548 | 0.7348 | — | 0.2225 | 0.2100 |
| Pt-cat | 0.000163 | 0.000163 | 0.000163 | 0.000163 | 0.000163 | 0.000163 |
| ExDT | 0.01 | 0.01 | — | 0.01 | — | — |
| ExW | — | — | 0.03 | — | 0.03 | 0.03 |
| Vi-DPS/ MPS/DMS | 0.1 | 0.1 | 0.1 | 0.1 | 0.05 | 0.05 |
| Vi-copolymer, low | — | — | 0.01 | — | 0.01 | 0.01 |
| GMS | 0.015 | 0.015 | 0.015 | 0.015 | 0.02 | 0.02 |
| CaCO3 | — | 0.05 | 0.04 | — | — | — |
| Kaolin | — | — | — | — | — | 0.05 |
| SiO2-1 | — | — | — | — | — | — |
| SiO2-3 | — | 0.05 | 0.05 | 0.07 | — | — |
| POSS | — | 0.02 | 0.02 | 0.02 | — | — |
| Total pbw | 1.0000 | 1.0000 | 1.0000 | 1.0000 | 1.0001 | 1.0000 |
| Pass/Fail | | | | | | |

†Packed
* Comparative

As can be seen from Table 7, Example 29 shows that large amounts of filler can be present in the curable filled compositions.

Table 8 shows formulations including a curable polyorganosiloxane composition including a phenyl-containing silicone with either dry, treated expanded polymer microspheres or wet expanded polymer microspheres. The compositions further optionally include glass microspheres, clay, or a combination thereof. The formulations further included a low viscosity copolymer.

TABLE 8

| | ExDT + Clay | ExDT + GMS + Clay | ExW + GMS + Clay | ExW + Halloysite | Halloysite (only)* |
|---|---|---|---|---|---|
| Vi-60000 | 0.6824 | 0.6786 | 0.6561 | 0.6299 | 0.6449 |
| Vi-100000 | 0.2274 | 0.2262 | 0.2187 | 0.2099 | 0.2149 |
| Pt-cat | 0.000163 | 0.000163 | 0.000163 | 0.000163 | 0.000163 |
| Vi-DPS/ MPS/DMS | 0.05 | 0.05 | 0.05 | 0.1 | 0.1 |
| Vi-copolymer, low | 0.01 | 0.01 | 0.01 | 0.01 | 0.01 |
| ExDT | 0.01 | — | — | — | — |
| ExW | — | — | 0.03 | 0.03 | — |

TABLE 8-continued

| | ExDT + Clay | ExDT + GMS + Clay | ExW + GMS + Clay | ExW + Halloysite | Halloysite (only)* |
|---|---|---|---|---|---|
| GMS | — | 0.02 | 0.02 | — | — |
| Halloysite | 0.02 | 0.015 | 0.015 | 0.02 | 0.03 |
| Clay | | | | | |
| Total pbw | 1.0000 | 1.0000 | 1.0000 | 1.0000 | 1.0000 |
| Pass/Fail | Pass | Pass | Pass | Pass | |

*Control

As can be seen from Table 8, a combination of expandable microspheres and halloysite clay with or without glass microspheres results in a pass in a ball-drop test.

Table 9 shows formulations including a curable polyorganosiloxane composition including a phenyl-containing vinyl silicone and a blend of phenyl methyl silicone flakes with a vinyl silicone (Vi-100000). The formulation further includes dry, treated expanded polymer microspheres, glass microspheres, and clay. A low viscosity copolymer is also present.

TABLE 9

| Component | ExD + Phenyl Flake Resin + Halloysite Quantity | ExD + Phenyl Flake Resin + Halloysite Component |
|---|---|---|
| Vi-60000 | 0.3500 | 0.4500 |
| Phenyl Flake:Vi-100000 (25:75) | 0.5000 | 0.4000 |
| Pt-cat | 0.000163 | 0.000163 |
| Vi-DPS/MPS/DMS | 0.1 | 0.1 |
| Vi-copolymer, low | 0.01 | 0.01 |
| ExD | 0.015 | 0.015 |
| Halloysite Clay | 0.02 | 0.02 |
| Total pbw | 0.9952 | 0.9952 |
| Pass/Fail | Pass | Pass |

As can be seen from Table 9, both samples passed in a ball-drop test.

Set forth below are non-limiting aspects of the present disclosure.

Aspect 1. A curable, filled composition for the manufacture of a filled silicone foam layer having a thickness of 20 to 300 micrometers, the composition comprising a curable polysiloxane composition comprising an alkenyl-substituted polyorganosiloxane, a hydride-substituted polyorganosiloxane, and a cure catalyst; a plurality of expanded polymer microspheres having a largest dimension of less than the thickness of the foam; and a filler composition, wherein each component of the filler composition has a largest dimension of less than the thickness of the foam, the filler composition comprising a particulate ceramic filler, or a particulate calcium carbonate filler, or a particulate aluminosilicate clay filler having a plate morphology, or a particulate aluminosilicate clay filler having a hollow tubular morphology, or a particulate polymeric silsesquioxane filler, or a particulate methyl-phenyl MQ filler, or a plurality of glass microspheres, or a particulate paraffin wax, or a combination thereof wherein the curable filled composition has a viscosity of less than 400,000 centiStokes, or 100,000 to 350,000 centiStokes.

Aspect 2. The curable, filled composition of aspect 1, wherein the curable polysiloxane composition further comprises a co-curable polyorganosiloxane containing at least two alkenyl groups and further comprising phenyl groups in a backbone thereof, preferably an alkenyl-terminated polyorganosiloxane further comprising phenyl groups on a backbone thereof.

Aspect 3. The curable, filled composition of aspect 1 or 2, wherein the expanded polymer microspheres are dry.

Aspect 4. The curable, filled composition of any of the preceding aspects, wherein the expanded polymer microspheres, the filler, or both comprise a surface pretreatment.

Aspect 5. The curable, filled composition of any of the preceding aspects, wherein the filler composition comprises an aluminosilicate clay having a hollow tube nanostructure; or calcium carbonate and an aluminosilicate clay having a platelet structure.

Aspect 6. A curable, filled silicone foam layer comprising a cured product of the composition of any of the preceding aspects, the filled silicone foam layer having a thickness of 20 to 300 micrometers, or 50 to 250 micrometers, or 60 to 200 micrometers.

Aspect 7. The filled silicone foam layer of aspect 6, further comprising an imbibed silicone oil, imbibed water, an imbibed nonreactive solvent, or a combination thereof.

Aspect 8. The filled silicone foam layer of aspect 6 or 7, having a compressive force deflection of 0 to 25 pounds per square inch (0 to 172 kilopascals), preferably 0 to 15 pounds per square inch (0 to 103 kilopascals), at 25% deflection and determined in accordance with ASTM D3574-17, and a compression set of 0 to 5%, determined in accordance with ASTM D 3574-95 Test D at 70° C.

Aspect 9. The filled silicone foam layer of any of aspects 6 to 8, having a water absorption of less than 2 weight percent by heating a sample at 50° C. for 24 hours, then submersing the sample in water for 30 seconds at room temperature, and a glass transition temperature of less than −115° C.

Aspect 10. An electronic article comprising the filled silicone foam layer of any of aspects 6 to 9.

Aspect 11. The electronic article of aspect 10, wherein the article comprises a screen of an electronic device, preferably wherein the screen is flexible.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect," "an aspect," "another aspect," "some aspects," and so forth, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. The term "combination" is inclusive of blends, mixtures, alloys, reaction products, and the like. In a list of alternatively useable species, "a combination thereof" means that the combination can include a combination of at least one element of the list with one or more like elements not named. Also, "at least one of" means that the list is inclusive of each element individually, as well as combinations of two or more elements of the list, and combinations of at least one element of the list with like elements not named.

Unless specified to the contrary herein, all test standards are the most recent standard in effect as of the filing date of this application, or, if priority is claimed, the filing date of the earliest priority application in which the test standard appears.

As used herein, the "diameter" of a particle refers to a diameter of a sphere or an equivalent diameter obtained from a particle size analyzer or from a two-dimensional image of an electron microscopy analysis, for example a transmission electron microscopy image analyzed using a program such as Image J. The notation "$D_x$" refers to a median particle size wherein x is the median. For example, a particle population having a $D_{50}$ of 5 μm means that 50% of the particles are larger than 5 μm and 50% are smaller than 5 μm. In an aspect, "a size" refers to a size of a single particle or a (e.g., a mean or a median) average of particles or a population of particles.

When an element such as a layer, film, region, or substrate is referred to as being "on" another element, it can be directly on the other element or intervening elements may also be present. In contrast, when an element is referred to as being "directly on" another element, there are no intervening elements present.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Unless defined otherwise, technical and scientific terms used herein have the same meaning as is commonly understood by one of skill in the art to which this invention belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A curable, filled composition for the manufacture of a filled silicone foam layer having a thickness of 60 to 200 micrometers, the composition comprising
   a curable polysiloxane composition comprising a high molecular weight vinyl-terminated polydimethylsiloxane, a lower weight vinyl-terminated poly(methyl phenyl) siloxane, a hydride-substituted polyorganosiloxane, and a cure catalyst;
   a plurality of dry, silica-treated preexpanded polymer microspheres having a largest dimension of less than the thickness of the foam;
   stearic acid-treated calcium carbonate; and
   vinyl-terminated silane-treated hexagonal platy kaolin having a largest dimension of less than the thickness of the foam;
   wherein the filled silicone foam layer comprises, based on a total weight of the filled silicone foam layer,
      3 to 7 wt % of the lower weight vinyl-terminated poly(methyl phenyl) siloxane,
      0.5 to 2 weight percent of the plurality of the dry, silica-treated preexpanded polymer microspheres,
      2 to 8 wt % of the stearic acid-treated calcium carbonate, and
      2 to 8 weight percent of the vinyl-terminated silane-treated hexagonal platy kaolin.

2. A filled silicone foam layer comprising a cured product of the composition of claim 1, the filled silicone foam layer having a thickness of 60 to 200 micrometers.

3. An electronic article comprising the filled silicone foam layer of claim 2.

4. The electronic article of claim 3, wherein the article comprises a screen of an electronic device.

5. A curable, filled composition for the manufacture of a filled silicone foam layer having a thickness of 60 to 200 micrometers, the composition comprising
   a curable polysiloxane composition comprising a high molecular weight vinyl-terminated polydimethylsiloxane, a lower weight vinyl-terminated poly(methyl phenyl) siloxane, a hydride-substituted polyorganosiloxane, and a cure catalyst;
   a plurality of dry, preexpanded polymer microspheres having a largest dimension of less than the thickness of the foam; and
   kaolin having a hollow tube nanostructure and a largest dimension of less than the thickness of the foam;
   wherein the filled silicone foam layer comprises, based on a total weight of the filled silicone foam layer,
      3 to 7 wt % of the lower weight vinyl-terminated poly(methyl phenyl) siloxane,
      0.5 to 2 weight percent of the plurality of the dry, preexpanded polymer microspheres, and
      1 to 3 weight percent of the kaolin having a hollow tube nanostructure.

6. A filled silicone foam layer comprising a cured product of the composition of claim 5, the filled silicone foam layer having a thickness of 60 to 200 micrometers.

7. An electronic article comprising the filled silicone foam layer of claim 6.

8. The electronic article of claim 7, wherein the article comprises a screen of an electronic device.

9. The curable, filled composition of claim 5, wherein the filled silicone foam layer comprises, based on a total weight of the filled silicone foam layer, 4 to 6 wt % of the lower weight vinyl-terminated poly(methyl phenyl) siloxane.

10. The curable, filled composition of claim 5, wherein the filled silicone foam layer comprises, based on a total weight of the filled silicone foam layer, 0.8 to 1.2 weight percent of the plurality of the dry, preexpanded polymer microspheres.

11. The curable, filled composition of claim 5, wherein the filled silicone foam layer comprises, based on a total weight of the filled silicone foam layer, 1.8 to 2.2 weight percent of the kaolin having a hollow tube nanostructure.

12. The curable, filled composition of claim 5, wherein the filled silicone foam layer comprises, based on a total weight of the filled silicone foam layer,
   4 to 6 wt % of the lower weight vinyl-terminated poly(methyl phenyl) siloxane,
   0.8 to 1.2 weight percent of the plurality of the dry, preexpanded polymer microspheres, and
   1.8 to 2.2 weight percent of the kaolin having a hollow tube nanostructure.

13. The curable, filled composition of claim 1, wherein the filled silicone foam layer comprises, based on a total weight of the filled silicone foam layer, 4 to 6 wt % of the lower weight vinyl-terminated poly(methyl phenyl) siloxane.

14. The curable, filled composition of claim 1, wherein the filled silicone foam layer comprises, based on a total weight of the filled silicone foam layer, 0.8 to 1.2 weight percent of the plurality of the dry, silica-treated preexpanded polymer microspheres.

15. The curable, filled composition of claim 1, wherein the filled silicone foam layer comprises, based on a total weight of the filled silicone foam layer, 3 to 7 wt % of the stearic acid-treated calcium carbonate.

16. The curable, filled composition of claim 1, wherein the filled silicone foam layer comprises, based on a total weight of the filled silicone foam layer, 3 to 7 weight percent of the vinyl-terminated silane-treated hexagonal platy kaolin.

17. The curable, filled composition of claim 1, wherein the filled silicone foam layer comprises, based on a total weight of the filled silicone foam layer, 4 to 6 wt % of the lower weight vinyl-terminated poly(methyl phenyl) siloxane, 0.8 to 1.2 weight percent of the plurality of the dry, silica-treated preexpanded polymer microspheres, 3 to 7 wt % of the stearic acid-treated calcium carbonate, and 3 to 7 weight percent of the vinyl-terminated silane-treated hexagonal platy kaolin.

* * * * *